(12) United States Patent
Mizuno

(10) Patent No.: US 6,501,552 B1
(45) Date of Patent: Dec. 31, 2002

(54) OBLIQUE INCIDENCE INTERFEROMETER FOR REMOVING HIGHER-ORDER INTERFERENCE FRINGES

(75) Inventor: Katsuyasu Mizuno, Aichi (JP)

(73) Assignee: Nidek Co., Ltd., Aichi (JP)

( * ) Notice: Subject to any disclaimer, the term of this patent is extended or adjusted under 35 U.S.C. 154(b) by 0 days.

(21) Appl. No.: 09/456,481

(22) Filed: Dec. 7, 1999

(30) Foreign Application Priority Data

Dec. 9, 1998 (JP) .......................................... 10-349651

(51) Int. Cl.$^7$ ................................................. G01B 9/02
(52) U.S. Cl. ...................................................... 356/512
(58) Field of Search ............................... 356/512, 514, 356/489, 495

(56) References Cited

U.S. PATENT DOCUMENTS 4,325,637 A * 4/1982 Moore ......................... 356/512
4,859,061 A * 8/1989 Inoue .......................... 356/512
5,532,821 A * 7/1996 Tronolone et al. .......... 356/512

FOREIGN PATENT DOCUMENTS

| JP | 60-209106 | | 10/1985 |
| JP | 18912 | * | 1/2000 |

* cited by examiner

Primary Examiner—Samuel A. Turner
(74) Attorney, Agent, or Firm—Sughrue Mion, PLLC

(57) ABSTRACT

An oblique incidence interferometer in which laser light from a laser light source is transmitted through a reference plane and is made incident upon a measurement surface from an oblique direction. The shape of the measurement surface is measured on the basis of interference fringes formed by reflected light reflected from the reference plane and reflected light reflected from the measurement surface. A deflecting element for deflecting the laser light emitted from the laser light source in order to decrease the coherence of the laser light is disposed in an optical path leading to the reference plane, the deflecting element being adapted to continuously change the direction of deflection.

14 Claims, 2 Drawing Sheets

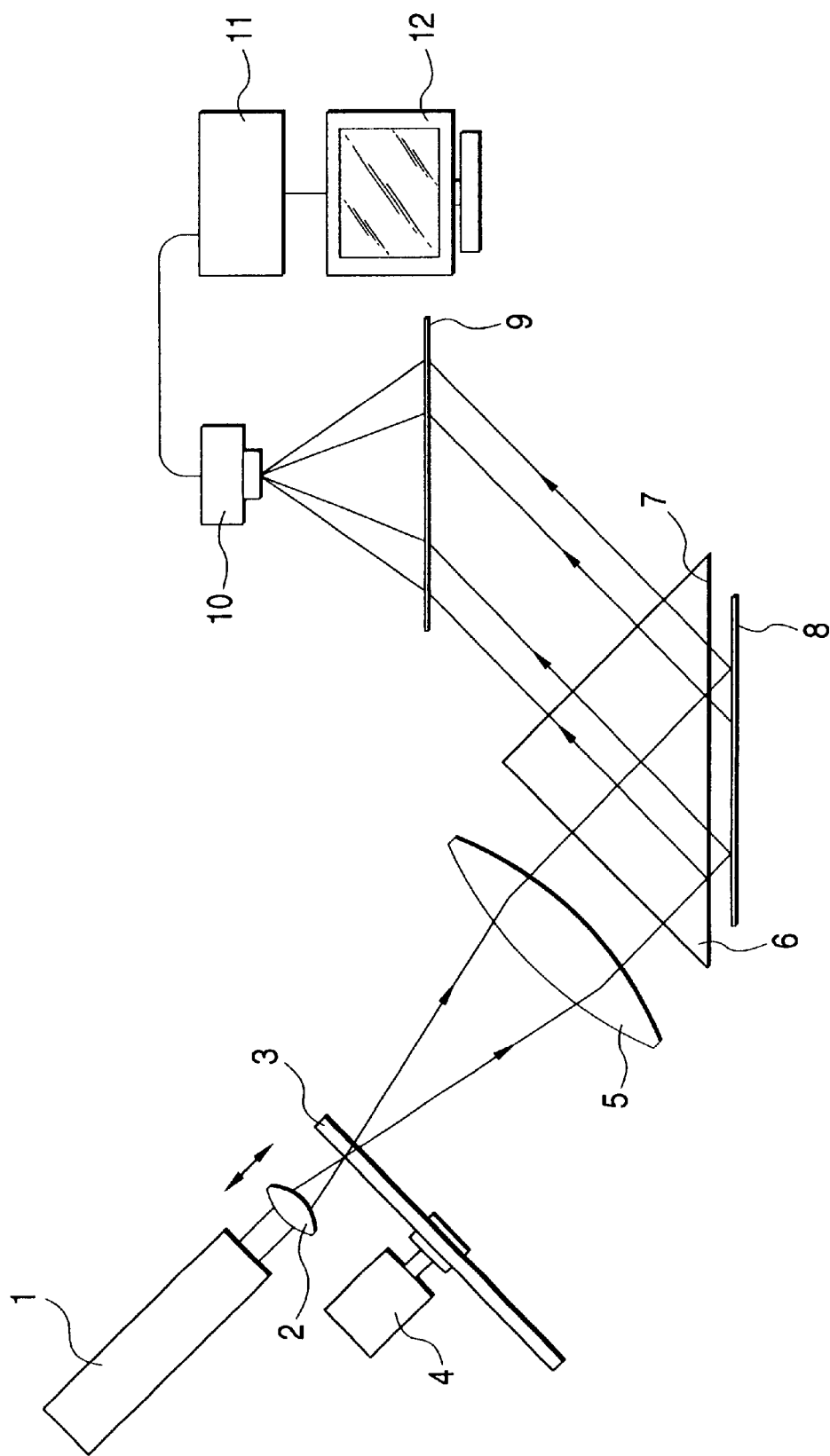

OBLIQUE INCIDENCE INTERFEROMETER FOR REMOVING HIGHER-ORDER INTERFERENCE FRINGES

BACKGROUND OF THE INVENTION

The present invention relates to an oblique incidence interferometer for measuring the shape of the surface of an object to be measured on the basis of interference fringes caused by light interference.

As an apparatus of this type, an oblique incidence interferometer is known which is used in the inspection of flatness of a silicon wafer in the process of manufacturing semiconductor devices. FIG. 2 is a diagram illustrating the configuration of an oblique incidence interferometer of a conventional example. Laser light emitted from an He-Ne laser 1 is focused at the focal point of a lens 2 to form a point light source, and after passing through a ground glass disk 3 disposed in its vicinity, the laser light is collimated into a parallel beam of light by a collimating lens 5 and is made incident upon a prism 6. The light reflected by a reference plane 7 of the prism 6 and the light transmitted through the reference plane 7 of the prism 6, reflected by a measurement surface 8 of the object to be measured, and transmitted again through the reference plane 7 of the prism 6 interfere with each other, and first-order interference fringes are formed on a screen 9. The interference fringes formed on the screen 9 are photographed by a camera 10, and their image is analyzed by an image processor 11, thereby measuring the shape of the measurement surface 8. It should be noted that the ground glass disk 3 is rotated at high speed by the motor 4 to eliminate the unevenness of the transmitted light due to the surface of the ground glass.

In such an oblique incidence interferometer, if the measurement surface 8 is close to the mirror surface or the interval between the measurement surface 8 and the reference plane 7 of the prism 6 is narrow, interference fringes caused by the light reflected by the reference plane 7 of the prism 6 and the light which was reflected and reciprocated more than twice between the measurement surface 8 and the reference plane 7 of the prism 6 can appear on the screen 9. These interference fringes are called higher-order interference fringes in contrast to the aforementioned first-order interference fringes. Unless these higher-order interference fringes are eliminated well, the result of measurement of the shape of the surface is apt to be erroneous.

To cope with this problem, in the above-described conventional example, the higher-order interference fringes are eliminated by making adjustment by moving the lens 2 in the direction of the optical axis of the projected laser light (in the direction of the optical axis of the lens 5) to offset the focal point of the lens 2 from the diffusing surface of the ground glass disk 3, so as to apparently enlarge the point light source and decrease the coherence of the laser light.

However, with the method in which the coherence is decreased by using the ground glass, since the transmittance at the ground surface is low, the power loss of the laser light results, so that the energy efficiency is poor. For this reason, there has been a drawback in that a laser light source having a large output is required, and the apparatus hence becomes expensive.

SUMMARY OF THE INVENTION

In view of the drawback of the above-described prior art, it is an object of the present invention to provide an apparatus which does not require a laser light source having a large output, and is capable of eliminating the higher-order interference fringes while keeping the first-order interference fringes necessary for the measurement.

The present invention provides the followings:

(1) An oblique incidence interferometer for measuring a shape of an measurement surface of an object, comprising:

a laser light source for emitting a laser light;

an oblique incidence optical system for making the laser light, emitted from the laser light source, incident obliquely upon the measuring surface through a reference plane; and deflecting means for deflecting the laser light, which is to be made incident upon the measurement surface by the oblique incidence optical system, in a deflecting direction to decrease coherence of the laser light, the deflecting means continuously changing the deflecting direction;

wherein the shape of the measurement surface is measured based on interference fringes formed by reflected light reflected from the reference plane and the measurement surface.

(2) The oblique incidence interferometer according to (1), wherein the deflecting means includes:

a prism formed of transparent material; and rotating means for continuously rotating the prism.

(3) The oblique incidence interferometer according to (2), further comprising:

adjusting means for adjusting a distance between the laser light source and the prism.

(4) The oblique incidence interferometer according to (2), further comprising:

imaging means for imaging the thus formed interference fringes, wherein the rotating means rotates the prism at a rotational speed depending on an image rate of the imaging means.

(5) The oblique incidence interferometer according to (1), wherein the laser light source includes a semiconductor laser light source.

(6) An oblique incidence interferometer comprising:

a laser light source disposed so as to make a laser beam incident obliquely upon a measurement surface of an object;

an optical element having a reference plane, the optical element being disposed between the laser light source and the measurement surface so that the reference plane is confronted with the measurement surface with a predetermined distance; and a deflecting element, disposed between the laser light source and the optical element, for deflecting the laser light in a deflecting direction, wherein the deflecting element continuously changes the deflecting direction.

(7) The oblique incidence interferometer according to (6), wherein the deflecting element includes a prism formed of transparent material.

(8) The oblique incidence interferometer according to (6), wherein the optical element includes a prism having the reference plane of a sufficient size relative to the measurement surface.

(9) The oblique incidence interferometer according to (6), further comprising:

a motor which continuously rotates the deflecting element.

(10) The oblique incidence interferometer according to (9), further comprising:
a screen and a camera which are disposed substantially symmetrically to the laser light source with respect to the measurement surface,
wherein the motor rotates the deflecting element at a rotational speed depending to an imaging rate of the camera.

(11) The oblique incidence interferometer according to (6), further comprising:
a moving mechanism which adjusts a distance between the laser light source and the deflecting element.

(12) The oblique incidence interferometer according to (6), wherein the laser light source includes a semiconductor laser light source.

The present disclosure relates to the subject matter contained in Japanese patent application No. Hei. 10-349651 (filed on Dec. 10, 1998), which is expressly incorporated herein by reference in its entirety.

BRIEF DESCRIPTION OF THE DRAWINGS

In the accompanying drawings:

FIG. 2 is a diagram illustrating the configuration of an oblique incidence interferometer of a conventional example.

DESCRIPTION OF THE PREFERRED EMBODIMENT

Figure 1:
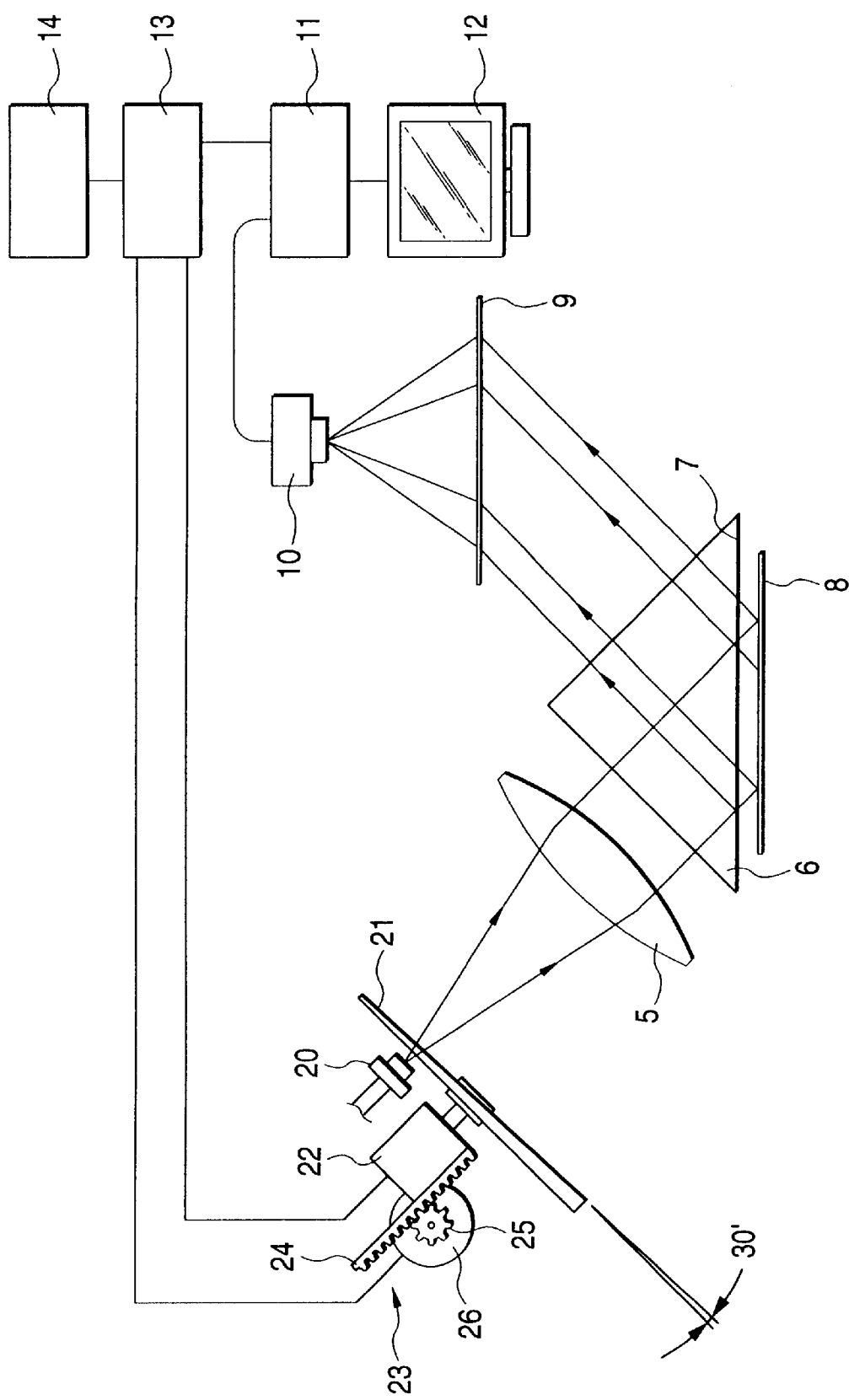
FIG. 1 is a diagram schematically illustrating the configuration of an oblique incidence interferometer in accordance with the present invention.

Referring now to the accompanying drawings, a description will be given of an embodiment of the present invention. FIG. 1 is a diagram schematically illustrating the configuration of an oblique incidence interferometer in accordance with the present invention. It should be noted that those elements which are similar to those of the conventional example shown in FIG. 2 are denoted by the same reference numerals.

Reference numeral 20 denotes a semiconductor laser light source which emits laser light with a wavelength of 655 nm, and this laser light source can be substantially regarded as a point light source. By using the semiconductor laser, it is possible to make the overall apparatus compact as compared with a gas laser such as an He-Ne laser or the like. Numeral 5 denotes a collimating lens with a focal length of 800 mm, and the laser light source 20 is disposed in the vicinity of the position of its rear focal point. A deflecting plate 21, which is fabricated by grinding and polishing both sides of transparent sheet glass, is disposed in the optical path between the laser light source 20 and the lens 5 in such a manner as to be located in the vicinity of the laser light source 20. As shown in the drawing, the deflecting plate 21 has its section formed as a prism with an apex angle of 30 minutes (angle of 0.5 degree). A rotating shaft of a motor 22 is attached to the center of the deflecting plate 21, and the laser light emitted from the laser light source 20 is subjected to the prismatic action of the deflecting plate 21 which is rotated by the motor 22, so that the deflecting direction of the laser light directed toward the lens 5 changes continuously.

The deflecting plate 21 and the motor 22 are integrally moved in the direction of the optical axis of the lens 5 by a moving mechanism 23, thereby adjusting the interval between the laser light source 20 and the deflecting plate 21. The moving mechanism 23 maybe comprised of a rack 24 for holding the motor 22, a pinion 25 meshing with the rack 24, a motor 26 for rotating the pinion 25, and so on.

After the laser light emitted from the laser light source 20 is subjected to the prismatic action of the deflecting plate 21 and is thereby refracted, the laser light is collimated into a parallel beam of light by the lens 5, and is made incident upon a prism 6. The light incident upon the prism 6 is separated into the light reflected from a reference plane 7 and the beam transmitted through the reference plane 7 and incident upon a measurement surface 8 from an oblique direction. The light reflected from the reference plane 7 and the light reflected from the measurement surface 8 and transmitted again through the reference plane 7 interfere with each other, and interference fringes are projected onto a screen 9. The interference fringes projected on the screen 9 are imaged by a television camera 10, and its output signal is inputted to an image processor 11. In the image processor 11, the inputted image is subjected to predetermined image processing, and the shape of the irregular surface of the measurement surface 8 is measured. Reference numeral 12 denotes a monitor on which the image of the interference fringes imaged by the camera 10 and the result of measurement are displayed. Numeral 13 denotes a control unit for controlling the rotation of the motor 22 and the motor 26. Numeral 14 denotes a control panel having a knob for driving the moving mechanism 23 and switches for instructing the apparatus.

Next, a description will be given of adjustment for eliminating the higher-order interference fringes in the above-described configuration. If the deflecting plate 21 is rotated by the rotation of the motor 22, the laser light source 20 rotates while apparently depicting a circle due to the prismatic action of the deflecting plate 21 (the radius of the circle at this time is determined by the refractive power of the deflecting plate 21 and the distance between the laser light source 20 and the deflecting plate 21). Since the imaging rate of a one-screen portion by the camera 10 is a ¹⁄₃₀ second, if the deflecting plate 21 is rotated at a speed with which the deflecting plate 21 undergoes at least one revolution in a ¹⁄₃₀ second, the deflection of the laser light by the deflecting plate 21 can be effected by a one-cycle portion or more with respect to the image of a one-screen portion. Namely, in terms of the imaging rate for the one-screen portion, this process is substantially equivalent to the apparent enlargement of the point light source by the ground glass disk 3 shown in the conventional example in FIG. 2, and it becomes possible to decrease the coherence of the laser light. In addition, since the deflecting plate 21 is formed by a transparent plate, its transmittance is far superior in comparison with the diffusion using the ground glass, and it is possible to suppress the power loss of the laser light.

The elimination of the higher-order interference fringes is effected by rotating the motor 26 by operating the knob on the control panel 14 so as to adjust the interval between the laser light source 20 and the deflecting plate 21. As the operator (adjuster) -adjusts the interval between the laser light source 20 and the deflecting plate 21, it is possible to adjust the degree of decrease in the coherence of the laser light transmitted through the deflecting plate 21. While confirming the interference fringes displayed on the monitor 12, the operator makes adjustment so that the higher-order interference (mainly second-order interference) is eliminated and the first-order interference fringes do not become thin.

As described above, in accordance with the present invention, since the coherence of the laser light can be decreased while minimizing the power loss of the laser light, a laser light source having a large output is not required, and it is possible to efficiently eliminate the higher-order interference fringes while keeping the first-order interference fringes necessary for the measurement. In addition, since a semiconductor laser having a small output can be used, a compact and inexpensive apparatus can be realized.

What is claimed is:

1. An oblique incidence interferometer for measuring a measurement surface of an object, comprising:

a laser light source for emitting a laser light;

an oblique incidence optical system for making the laser light, emitted from the laser light source, incident obliquely upon the measurement surface through a reference plane, the oblique incident optical system including a deflecting optical element which deflects the laser light to make the laser light source appear as if the laser light source is moved, when the laser light source is viewed from the measurement surface;

an imaging optical system for obtaining an image of interference fringes formed by reflected laser light reflected from the reference plane and the measurement surface; and control means for acquiring interference fringe image signals of a one-screen portion while deflecting the laser light with the deflecting optical element during a cycle of an imaging rate of the one-screen portion.

2. The oblique incidence interferometer according to claim 1, wherein the deflecting optical element includes a prism formed of transparent material.

3. The oblique incidence interferometer according to claim 1, further comprising:

adjusting means for adjusting a distance between the laser light source and the deflecting optical element.

4. The oblique incidence interferometer according to claim 1, further comprising:

rotating means for rotating the deflecting optical element at a rotational speed depending on the imaging rate of the imaging optical system.

5. The oblique incidence interferometer according to claim 1, wherein the laser light source includes a semiconductor laser light source.

6. An oblique incidence interferometer comprising:

a laser light source disposed so as to make a laser light incident obliquely upon a measurement surface of an object;

an optical element having a reference plane, the optical element being disposed between the laser light source and the measurement surface so that the reference plane is spaced apart from the measurement surface by a predetermined distance;

a deflecting element, disposed between the laser light source and the optical element, for deflecting the laser light to make the laser light source appear as if the laser light source is moved, when the laser light source is viewed from the measurement surface;

an imaging optical system having an imaging element for obtaining an image of interference fringes formed by reflected laser light reflected from the reference plane and the measurement surface; and a control unit for acquiring interference fringe image signals of a one-screen portion while deflecting the laser light with the deflecting element during a cycle of an imaging rate of the one-screen portion.

7. The oblique incidence interferometer according to claim 6, wherein the deflecting element includes a prism formed of transparent material.

8. The oblique incidence interferometer according to claim 6, wherein the optical element includes a prism having the reference plane of a sufficient size relative to the measurement surface.

9. The oblique incidence interferometer according to claim 6, further comprising:

a motor which continuously rotates the deflecting element.

10. The oblique incidence interferometer according to claim 9, wherein the motor rotates the deflecting element at a rotational speed depending on the imaging rate of the imaging element.

11. The oblique incidence interferometer according to claim 6, further comprising:

a moving mechanism which adjusts a distance between the laser light source and the deflecting element.

12. The oblique incidence interferometer according to claim 6, wherein the laser light source includes a semiconductor laser light source.

13. An oblique incidence interferometer for measuring a measurement surface of an object, comprising:

an oblique incidence optical system for making a laser light incident obliquely upon the measurement surface through a reference plane, the oblique incidence optical system including a deflecting optical element for deflecting the laser light;

a rotating unit for continuously rotating a deflecting direction of the deflecting optical element;

an imaging optical system for obtaining an image of interference fringes formed by reflected laser light reflected from the reference plane and the measurement plane; and wherein the rotating unit rotates the deflecting optical element at a rotation speed that depends on an imaging rate of the imaging optical system.

14. The oblique incidence interferometer according to claim 13, wherein:

the oblique incidence optical system includes a collimator lens for collimating the laser light into substantially parallel rays of light; and the rotating unit rotates the deflecting direction of the deflecting optical element about an optical axis of the collimator lens.

* * * * *